US012320130B2

(12) United States Patent
De Rick

(10) Patent No.: US 12,320,130 B2
(45) Date of Patent: Jun. 3, 2025

(54) FLOOR PANELS AND METHOD FOR PRODUCING FLOOR PANELS AND CUTTING TOOLS USED THEREIN

(71) Applicant: FLOORING INDUSTRIES LIMITED, SARL, Bertrange (LU)

(72) Inventor: Jan De Rick, Geraardsbergen (BE)

(73) Assignee: UNILIN BV, Wielsbeke (BE)

( * ) Notice: Subject to any disclaimer, the term of this patent is extended or adjusted under 35 U.S.C. 154(b) by 194 days.

(21) Appl. No.: 18/010,349

(22) PCT Filed: Jun. 7, 2021

(86) PCT No.: PCT/IB2021/054972

§ 371 (c)(1),
(2) Date: Dec. 14, 2022

(87) PCT Pub. No.: WO2021/260466

PCT Pub. Date: Dec. 30, 2021

(65) Prior Publication Data

US 2023/0228100 A1 Jul. 20, 2023

(30) Foreign Application Priority Data

Jun. 24, 2020 (BE) .................................. 2020/5462

(51) Int. Cl.
*E04F 15/00* (2006.01)
*B27F 1/06* (2006.01)
(Continued)

(52) U.S. Cl.
CPC .......... *E04F 15/02038* (2013.01); *B27F 1/06* (2013.01); *E04F 15/04* (2013.01);
(Continued)

(58) Field of Classification Search
CPC .......... E04F 15/02033; E04F 15/02038; E04F 15/107; E04F 15/102; E04F 2201/042;
(Continued)

(56) References Cited

U.S. PATENT DOCUMENTS 6,006,486 A * 12/1999 Moriau .................... B27M 3/04 52/592.1
6,772,568 B2 * 8/2004 Thiers ..................... E04F 15/04 52/592.1

(Continued)

FOREIGN PATENT DOCUMENTS

EP 1640530 A2 3/2006
WO 9747834 A1 12/1997

(Continued)

OTHER PUBLICATIONS

Belgian Search Report from corresponding Belgian Application No. BE 202005462, Mar. 17, 2021.

(Continued)

*Primary Examiner* — Chi Q Nguyen
(74) *Attorney, Agent, or Firm* — Workman Nydegger

(57) ABSTRACT

Floor panels have coupling parts in the form of a tongue and groove with locking surfaces. In a coupled state of two such panels, an open space is present, viewed vertically, between the tongue and the lower lip, and viewed horizontally, between the contact zone and the contact between the horizontally active locking surfaces. The underside of the tongue in the open space comprises a first face. The top side of the lower lip in the open space comprises a second face parallel to the first face. In the coupled state of two such panels, at least one face is perpendicular to the panel and intersects both the first face of the first coupled panel and the second plane of the panel coupled to the first panel.

20 Claims, 6 Drawing Sheets

(51) Int. Cl.

| | |
|---|---|
| ***E04F 15/02*** | (2006.01) |
| *E04F 15/04* | (2006.01) |
| *E04F 15/08* | (2006.01) |
| *E04F 15/10* | (2006.01) |

(52) U.S. Cl.
CPC ............. *E04F 15/08* (2013.01); *E04F 15/105* (2013.01); *E04F 2201/0153* (2013.01); *E04F 2201/023* (2013.01); *E04F 2201/043* (2013.01)

(58) Field of Classification Search
CPC .......... E04F 2201/0107; E04F 2201/03; E04F 15/105; E04F 2201/0115; E04F 2201/0153; E04F 2201/0552; E04F 2201/023; E04F 2201/0535; E04F 2201/0146; E04F 2201/043; E04F 2201/0547; E04F 2201/0138; E04F 15/04; E04F 15/08; B32B 2471/00; B27F 1/06
See application file for complete search history.

(56) References Cited

U.S. PATENT DOCUMENTS

| | | | | |
|---|---|---|---|---|
| 6,786,019 | B2 * | 9/2004 | Thiers | E04F 15/02 52/592.1 |
| 7,467,499 | B2 * | 12/2008 | Moriau | B27M 3/04 52/592.1 |
| 10,428,534 | B2 * | 10/2019 | Cappelle | E04F 15/02194 |
| 11,002,021 | B2 * | 5/2021 | Cappelle | E04F 15/02038 |
| 11,421,425 | B2 * | 8/2022 | Markovski | E04F 15/02038 |
| 11,993,939 | B2 * | 5/2024 | Van Vlassenrode | B32B 27/20 |
| 2021/0381256 | A1 * | 12/2021 | Ceysson | E04F 15/02038 |
| 2023/0304299 | A1 * | 9/2023 | Boucké | E04F 15/10 |
| 2023/0304300 | A1 * | 9/2023 | Boucké | E04F 15/02038 |
| 2023/0366210 | A1 * | 11/2023 | Boucké | E04F 15/02016 |
| 2023/0399856 | A1 * | 12/2023 | Boucké | E04F 13/0894 |

FOREIGN PATENT DOCUMENTS

| | | | |
|---|---|---|---|
| WO | 0196688 | A1 | 12/2001 |
| WO | 0198603 | A2 | 12/2001 |
| WO | 2008010060 | A1 | 1/2008 |
| WO | 2017187298 | A2 | 11/2017 |

OTHER PUBLICATIONS

International Search Report from corresponding PCT Application No. PCT/IB2021/054972, Oct. 5, 2021.

* cited by examiner

FLOOR PANELS AND METHOD FOR PRODUCING FLOOR PANELS AND CUTTING TOOLS USED THEREIN

BACKGROUND

The invention concerns floor panels and a method for the manufacture of floor panels. The invention also concerns cutting tools which are used in the manufacture of such panels and/or in the method.

More particularly, the invention concerns floor panels which are intended to form a floating floor covering and which can be coupled together at their sides during laying by means of mechanical coupling parts, which may or may not be configured integrally with the floor panel and provide a mutual locking of the floor panels both in the horizontal and in the vertical direction, as described for example in WO97/47834, WO01/98603, WO01/96688 and WO2008/010060A1.

As shown in WO97/47834, the contour of such coupling parts may be formed using material-removal machining with at least two milling cutters. WO01/96688 discloses providing a sloping edge at the upper edge of the floor panels, whereby it is possible to form such coupling parts with similar cutting tools for both thin and thick floor panels. The method disclosed in WO01/96688 however concerns purely a shift in height of the total contour of the coupling parts, and does not allow this contour to be optimised with respect to the thickness of the floor panel.

The method described in WO2008/010060A1 concerns a more efficient and/or more economic manufacturing method for series of floor panels of different thicknesses, wherein the contour of the coupling parts can indeed be optimised as specified above.

The method of WO2008/010060A1 concerns a method for manufacturing floor panels of the type which has coupling parts on at least two opposite sides, which coupling parts, when two such floor panels interact with one another, achieve both a lock in the vertical direction perpendicular to the plane of the floor panels and a lock in the horizontal direction perpendicular to the respective sides and in the plane of the floor panels; wherein the lock in the vertical direction is achieved by means of a tongue and groove connection, wherein this groove is delimited by a lower and an upper lip, and wherein for achieving the lock in the horizontal direction, the coupling parts are provided with locking parts in the form of a recess in the above-mentioned lower lip and a protrusion cooperating therewith on the underside of the tongue, which form at least horizontally active locking surfaces when two such floor panels interact; wherein the locking surface formed on the flanks of the above-mentioned recess is situated at least partially in a part of the lower lip which extends past the upper lip; wherein the method comprises at least the step of forming the coupling part with the above-mentioned groove; wherein the contour of this coupling part is composed of at least two portions, namely a first portion which extends at least from the above-mentioned locking surface of the recess to a rising flank part of the recess, and a second portion which extends at least from the underside of the above-mentioned upper lip to the top side of the above-mentioned lower lip. The method of WO2008/010060A1 is used for manufacturing at least two series of floor panels, wherein the floor panels of a first series differ from the floor panels of a second series at least in that they have a different thickness; the above-mentioned two portions of the contour of the coupling part with the above-mentioned groove are configured identically in both series of floor panels; and at least the above-mentioned first portion of the contour in the above-mentioned second series of floor panels is produced at a relative position with respect to the upper edge of the floor panel which is shifted at least laterally relative to its position in the above-mentioned first series of floor panels.

SUMMARY

It is an object of the invention to offer floor panels which can be produced more easily in different thicknesses and which can be easily coupled together by means of a angling movement. It is an object of the invention to describe a method which allows production of floor panels of different thicknesses with the same cutting tools, and in which the floor panels can easily be coupled together by means of a angling movement. It is a further object of the invention to describe cutting tools which may be used for producing such floor panels and/or may be used in such a method.

The first aspect of the invention concerns a floor panel. The floor panel has coupling parts on a first pair of opposite sides. When two such floor panels are coupled together at their first pair of opposite sides, the coupling parts establish both a lock in the vertical direction perpendicular to the plane of the floor panels and a lock in the horizontal direction perpendicular to the respective sides and in the plane of the floor panels. The lock in the vertical direction is achieved using a tongue and groove connection, wherein said groove is delimited by a lower lip and an upper lip. In order to achieve the lock in the horizontal direction, the coupling parts are provided with locking parts in the form of a recess in the lower lip and a protrusion cooperating therewith on the underside of the tongue which, when two such floor panels are coupled together, form at least horizontally active locking surfaces, wherein the locking surface which is formed on the flanks of said recess is situated at least partially in a part of the lower lip which extends past the upper lip. In the coupled state of two such panels at their first pair of opposite sides, a contact zone is formed between the underside of the tongue and the lower lip. The floor panel is configured such that in the coupled state of two such panels at their first pair of opposite sides, an open space is present, viewed vertically, between the tongue and the lower lip, and viewed horizontally, between the contact zone and the contact between the horizontally active locking surfaces. The floor panel is characterized in that the underside of the tongue in the open space has a first face, and the top side of the lower lip in the open space has a second face, wherein the first face is parallel to the second face; and wherein in coupled state of a first such panel with its tongue in the groove of a second such panel, at least one face perpendicular to the coupled panels and parallel to the first pair of opposite sides intersects both the first face of the first coupled panel and the second face of the second panel.

The profiles of the coupling parts on the first pair of opposite sides—and more specifically the tongue and the groove—of floor panels according to the first aspect of the invention are configured such that, maximally, the coupling parts of floor panels with different thickness can be produced with the same cutting tools. This is achieved while retaining the ease of coupling of such panels at the first pair of opposite sides by means of a angling movement. The ease of coupling by means of a angling movement is determined by various factors. The angle and the turning circle through which angling must be performed are important. When coupling with pretension, coupling may be easier if the pretension can be achieved better and more easily.

These advantages are achieved because the profile of the coupling parts of floor panels according to the first aspect of the invention—and more particularly, the specific first and second faces—allows the cutting tools to be moved more easily horizontally and vertically for optimal dimensioning of coupling parts in floor panels of different thicknesses.

Preferably, the first face and the second face are parallel to the plane of the panel. This facilitates production of the panels, inter alia because it allows the cutting tools which produce the first and second faces to be adjusted more easily.

Preferably, the floor panel is configured such that in coupled state at the first pair of opposite sides, the lower edge of the tongue in the open space has a third face distally from the first face, wherein the third face makes a greater angle with the plane of the panel than the first face. Such embodiments further facilitate the production of floor panels of different thickness using the same cutting tools.

Preferably, the floor panel is configured such that in coupled state at the first pair of opposite sides, the lower edge of the tongue in the open space has a fourth face proximally to the first face, wherein the fourth face makes a greater angle with the plane of the panel than the first face. Such embodiments further facilitate the production of floor panels of different thickness using the same cutting tools.

More preferably, viewed from the distal direction to the proximal direction of the panel, both the third face and the fourth face are oriented towards the lower edge of the panel. Such embodiments further facilitate the production of floor panels of different thickness using the same cutting tools.

Preferably, the angle between the third face and the fourth face is less than 3°. More preferably, the third face and the fourth face are parallel to one another.

Preferably, the side of the first pair of opposite sides containing the tongue comprises a first closing face. The side of the first pair of opposite sides containing the groove comprises a second closing face at the distal end of the upper lip. In coupled state of two such panels at their first pair of opposite sides, contact is present between the first closing face and the second closing face of the coupled panels, wherein the extension of the first closing face intersects the third face.

Preferably, the floor panel is configured such that in coupled state at the first pair of opposite sides, the upper edge of the lower lip in the open space has a fifth face distally from the second face, wherein the fifth face makes a greater angle with the plane of the panel than the second face. Such embodiments further facilitate the production of floor panels of different thickness using the same cutting tools.

Preferably, the floor panel is configured such that in coupled state at the first pair of opposite sides, the upper edge of the lower lip in the open space has a sixth face proximally to the second face, wherein the sixth face makes a greater angle with the plane of the panel than the second face. Such embodiments further facilitate the production of floor panels of different thickness using the same cutting tools.

More preferably, viewed from the distal direction to the proximal direction of the panel, both the fifth face and the sixth face are oriented towards the upper edge of the panel. Such embodiments further facilitate the production of floor panels of different thickness using the same cutting tools.

Preferably, the fifth face makes a greater angle with the plane of the panel than the sixth face. More preferably, the difference between the angle of the fifth face with the plane of the panel and the angle of the sixth face with the plane of the panel is more than 10°, preferably more than 15°. Such embodiments further facilitate the production of floor panels of different thickness using the same cutting tools.

Preferably, the side of the first pair of opposite sides containing the tongue comprises a first closing face. The side of the first pair of opposite sides containing the groove comprises a second closing face at the distal end of the upper lip. In coupled state of two such panels at their first pair of opposite sides, contact is present between the first closing face and the second closing face of the coupled panels. The extension of the second closing face intersects the sixth face. Such embodiments further facilitate the production of floor panels of different thickness using the same cutting tools.

The second aspect of the invention is a floor panel, optionally as in any embodiment of the first aspect of the invention. The floor panel has coupling parts on a first pair of opposite sides. When two such floor panels are coupled together at their first pair of opposite sides, the coupling parts establish both a lock in the vertical direction perpendicular to the plane of the floor panels and a lock in the horizontal direction perpendicular to the respective sides and in the plane of the floor panels. The lock in the vertical direction is achieved using a tongue and groove connection, wherein said groove is delimited by a lower lip and an upper lip. In order to achieve the lock in the horizontal direction, the coupling parts are provided with locking parts in the form of a recess in the lower lip and a protrusion cooperating there with on the underside of the tongue, which when two such floor panels are coupled together, form at least horizontally active locking surfaces, wherein the locking surface which is formed on the flanks of said recess is situated at least partially in a part of the lower lip which extends past the upper lip. In the coupled state of two such panels at their first pair of opposite sides, a contact zone is formed between the underside of the tongue and the lower lip. The floor panel is configured such that in the coupled state of two such panels at their first pair of opposite sides, an open space is present, viewed vertically, between the tongue and the lower lip, and viewed horizontally, between the contact zone and the contact between the horizontally active locking surfaces. The underside of the tongue in the open space comprises a first face. The top side of the lower lip in the open space comprises a second face. In coupled state of a first such panel with its tongue in the groove of a second such panel, at least one face perpendicular to the coupled panels and parallel to the first pair of opposite sides intersects both the first face of the first coupled panel and the second face of the second panel. In the open space, the lower edge of the tongue comprises a third face distally from the first face, wherein the third face makes a greater angle with the plane of the panel than the first face. In the open space, the lower edge of the tongue comprises a fourth face proximally to the first face, wherein the fourth face makes a greater angle with the plane of the panel than the first face. In the open space, the upper edge of the lower lip comprises a fifth face distally from the second face, wherein the fifth face makes a greater angle with the plane of the panel than the second face. In the open space, the upper edge of the lower lip comprises a sixth face proximally to the second face, wherein the sixth face makes a greater angle with the plane of the panel than the second face.

The profiles of the coupling parts on the first pair of opposite sides—and more specifically the tongue and the groove—of floor panels according to the second aspect of the invention are configured such that, maximally, the coupling parts of floor panels with different thickness can be produced with the same cutting tools. This is achieved while retaining the ease of coupling of such panels at the first pair of opposite sides by means of a angling movement. The ease of coupling by means of a angling movement is determined by various factors. The angle and the turning circle through which angling must be performed are important. When coupling with pretension, coupling may be easier if the pretension can be achieved better and more easily.

These advantages are achieved because the profile of the coupling parts of floor panels according to the first aspect of the invention—and more particularly, the specific first and second faces—allows the cutting tools to be moved more easily horizontally and vertically for optimal dimensioning of coupling parts in floor panels of different thicknesses.

In a preferred embodiment of the second aspect of the invention, viewed from the distal direction to the proximal direction of the panel, both the third face and the fourth face are oriented towards the lower edge of the panel. Such embodiments further facilitate the production of floor panels of different thickness using the same cutting tools.

In a preferred embodiment of the second aspect of the invention, viewed from the distal direction to the proximal direction of the panel, both the fifth face and the sixth face are oriented towards the upper edge of the panel. Such embodiments further facilitate the production of floor panels of different thickness using the same cutting tools.

In a preferred embodiment of the second aspect of the invention, the angle between the third face and the fourth face is less than 3°. More preferably, the third face and the fourth face are parallel to one another. Such embodiments further facilitate the production of floor panels of different thickness using the same cutting tools.

In a preferred embodiment of the second aspect of the invention, the fifth face makes a greater angle with the plane of the panel than the sixth face. More preferably, the difference between the angle of the fifth face with the plane of the panel and the angle of the sixth face with the plane of the panel is more than 10°, more preferably more than 15°. Such embodiments further facilitate the production of floor panels of different thickness using the same cutting tools.

In a preferred embodiment of the second aspect of the invention, the side of the first pair of opposite sides containing the tongue comprises a first closing face. The side of the first pair of opposite sides containing the groove comprises a second closing face at the distal end of the upper lip. In coupled state of two such panels at their first pair of opposite sides, contact is present between the first closing face and the second closing face of the coupled panels. The extension of the first closing face intersects the third face. Such embodiments further facilitate the production of floor panels of different thickness using the same cutting tools.

In a preferred embodiment of the second aspect of the invention, the side of the first pair of opposite sides containing the tongue comprises a first closing face. The side of the first pair of opposite sides containing the groove comprises a second closing face at the distal end of the upper lip. In coupled state of two such panels at their first pair of opposite sides, contact is present between the first closing face and the second closing face. The extension of the second closing face intersects the sixth face. Such embodiments further facilitate the production of floor panels of different thickness using the same cutting tools.

In a preferred embodiment of the first and/or the second aspect of the invention, in coupled state of two such panels at their first pair of opposite sides, a second contact zone is formed between the lower edge of the tongue and the upper edge of the lower lip. The second contact zone, considered for the floor panel coupled at its groove, is distally positioned with respect to the second face.

More preferably, the second contact zone—considered for the floor panel coupled at its groove—is proximally positioned with respect to the contact between the horizontally active locking surfaces.

Preferably, the second contact zone extends continuously in the contact between the horizontally active locking surfaces.

In a preferred embodiment of the first and/or the second aspect of the invention, in coupled state of two such panels, a pretension is present between the horizontally active locking faces, preferably due to a bending of the lower lip.

In a preferred embodiment of the first and/or second aspect of the invention, two such panels can be coupled at their first pair of opposite sides by means of a angling movement of one such panel parallel to its first pair of opposite sides, with its tongue in the groove of the second such panel.

In a preferred embodiment of the first and/or second aspect of the invention, the side of the first pair of opposite sides containing the tongue comprises a first closing face. The side of the first pair of opposite sides containing the groove comprises a second closing face at the distal end of the upper lip. In coupled state of two such panels at their first pair of opposite sides, contact is present between the first closing face and the second closing face of the coupled panels, wherein the first face is situated completely proximally to the first closing face.

In a preferred embodiment of the first and/or second aspect of the invention, the first face is situated distally from the lowest point of the lower edge of the tongue. Such embodiments further facilitate the production of floor panels of different thickness using the same cutting tools.

In a preferred embodiment of the first and/or second aspect of the invention, the floor panel comprises a substrate and optionally a decorative top layer, wherein the substrate comprises one or more of:

- a wood-based substrate, for example one or more wood layers, a chipboard or a fibreboard (e.g. MDF board or HDF board);
- a synthetic substrate, wherein the synthetic substrate comprises a polymer matrix and optional fillers, wherein the polymer of the polymer matrix may consist for example of polyvinyl chloride, polyurethane or polypropylene, wherein the optional fillers may comprise one or more mineral fillers (e.g. lime, chalk, clay, talcum or calcium carbonate) or wood-based fillers (e.g. wood dust or wood fibres), optionally wherein in one or more layers of the synthetic substrate, the polymer matrix is a foamed or non-foamed polymer matrix;
- a mineral substrate, for example a magnesium oxide board, a gypsum board, a fibre cement board or a mineral fibre board, for example wherein the mineral fibres (e.g. glass or basalt fibres) are bonded together by means of a resin.

The third aspect of the invention is a method for producing floor panels, wherein a first floor panel is produced with a first thickness and wherein a second floor panel is produced with a second thickness. The first floor panel and the second floor panel are floor panels as in any embodiment of the first and/or second aspect of the invention. The first face of the first floor panel is parallel to the first face of the second floor panel; and/or the second face of the first floor panel is parallel to the second face of the second floor panel.

The method of the third aspect of the invention allows the coupling parts of floor panels with different thicknesses to be formed with minimum change of cutting tools or even with completely the same cutting tools, wherein the floor panels of different thicknesses have tongue and groove coupling parts which can easily be coupled together via a angling movement.

In a preferred embodiment of the method of the invention, the first face of the first floor panel and the first face of the second floor panel are formed by the same cutting tool.

In a preferred embodiment of the method of the invention, the second face of the first floor panel and the second face of the second floor panel are formed by the same cutting tool. Preferably, this cutting tool also forms the proximal end of the groove of the first floor panel and of the second floor panel.

In a preferred embodiment of the method of the invention, the distal end of the tongue of the first floor panel and the distal end of the tongue of the second floor panel are formed by the same cutting tool. Preferably, this cutting tool also forms the third face of both the first floor panel and the second floor panel.

In a preferred embodiment of the method of the invention, the locking surface situated on the flanks of the recess of the first floor panel, and the locking surface situated on the flanks of the recess of the second floor panel, are formed by the same cutting tool. Preferably, this takes place using the same cutting tool which forms the fifth face of the first floor panel and of the second floor panel.

In a preferred embodiment of the method of the invention, the difference in thickness between the first floor panel and the second floor panel is at least 2 millimetres, more preferably at least 3 millimetres, and more preferably at least 4 millimetres, and even more preferably at least 5 millimetres.

In a preferred embodiment of the method of the invention, the first floor panel is thicker than the second floor panel, and the lower lip of the first floor panel protrudes over a greater distance relative to its upper lip than is the case in the second floor panel.

In a preferred embodiment of the method of the invention, the first floor panel is thicker than the second floor panel. The deepest point of the recess in the lower lip of the first floor panel lies at a greater distance from the lower edge of the panel than in the second floor panel. The difference in distance between the lower edge of the panel and the deepest point of the recess in the lower lip, between the first floor panel and the second floor panel, is smaller than the difference in thickness between the first floor panel and the second floor panel.

In a preferred embodiment of the method of the invention, the first face is formed by a first cutting tool, and the distal end of the tongue is formed by a second cutting tool.

In a preferred embodiment of the method of the invention, the second face is formed by a third cutting tool, and the locking surface situated on the flanks of the recess of the floor panel is formed by a fourth cutting tool.

The fourth aspect of the invention is a cutting tool for use in any embodiment of the third aspect of the invention, and/or for producing a floor panel as in any embodiment of the floor panel of the first and/or second aspect of the invention, wherein the cutting tool is configured for producing the first face.

Preferably, the cutting tool of the fourth aspect of the invention is configured for producing a fourth face. In coupled state of two such floor panels at their first pair of opposite sides, the fourth face in the open space is situated on the lower edge of the tongue proximally to the first face, wherein the fourth face makes a greater angle with the plane of the panel than the first face.

The fifth aspect of the invention is a cutting tool for use in any embodiment of the third aspect of the invention, and/or for producing a floor panel as in any embodiment of the floor panel of the first and/or second aspect of the invention, wherein the cutting tool is configured for producing the second face.

Preferably, the cutting tool of the fourth aspect of the invention is configured for producing a sixth face. In coupled state of two such floor panels at their first pair of opposite sides, the sixth face in the open space is situated on the upper edge of the lower lip proximally to the second face, wherein the sixth face makes a greater angle with the plane of the panel than the second face.

Preferably, the cutting tools of the third and/or fourth aspect of the invention are milling cutters.

The sixth aspect of the invention is a set of cutting tools which contains a cutting tool as in any embodiment of the fourth aspect of the invention and a cutting tool as in any embodiment of the fifth aspect of the invention.

Primarily—but not exclusively—the invention with its various aspects is intended for use with wood-based or wooden floor panels, as may be the case with floor panels of a laminate parquet floor, a ready-to-lay floor, a veneer parquet floor or a solid parquet floor.

In laminate parquet flooring, normally floor panels are used in which the top layer is composed of one or more resin-impregnated carrier sheets. Such laminate floor panels usually comprise a one-piece substrate, for example made of MDF or HDF (Medium Density Fibreboard or High Density Fibreboard) and a printed decor which determines the appearance on the top side. As known, laminate floor panels may be manufactured in various ways. According to a first possibility, they may be manufactured using a DPL technique (Direct Pressure Laminate), wherein the above-mentioned carrier sheets together with the substrate are placed in a press where they are consolidated under the effect of high pressure and temperature. According to a second possibility, they may be manufactured using an HPL technique (High Pressure Laminate) wherein the above-mentioned carrier sheets are consolidated firstly into a so-called compact laminate, and then they are glued onto the substrate. On the underside of laminate floor panels, usually a so-called backing layer or balancing layer is used, which is preferably also constructed from at least one resin-impregnated or resin-coated carrier sheet.

In ready-to-lay parquet flooring, the floor panels have a top layer based on real wood, normally thicker than veneer, which top layer for example has a thickness of 2 to 5 millimetres, and is arranged on a wooden or wood-based one-piece or multipiece substrate.

BRIEF DESCRIPTION OF THE DRAWINGS

Further features may appear from the following examples. With the aim of presenting the features of the invention better, some preferential embodiments are described below as examples without limitative character, with reference to the appended drawings in which.

DETAILED DESCRIPTION OF VARIOUS EMBODIMENTS

Figure 1:
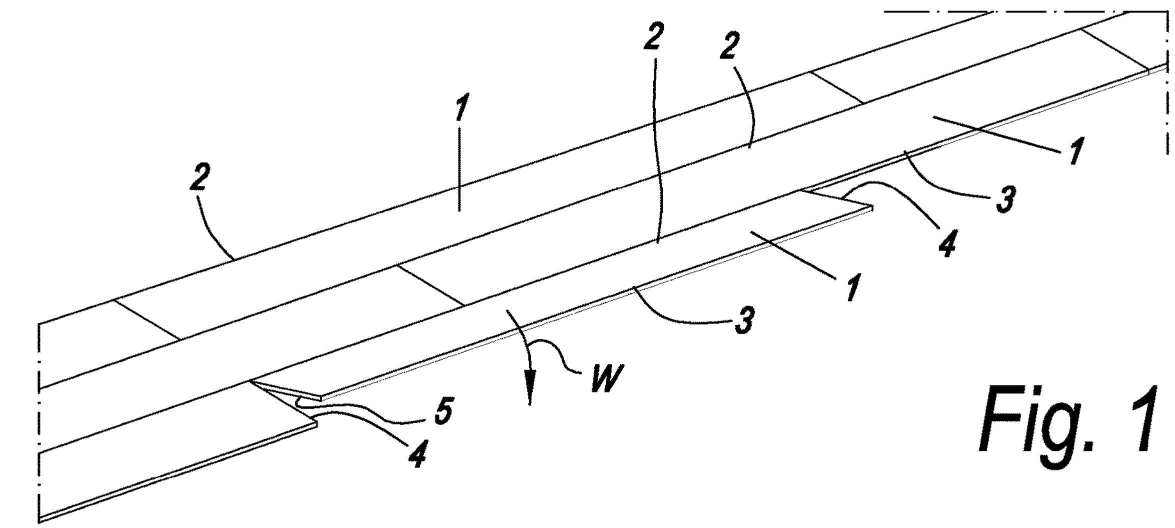
FIG. 1 shows a floor covering consisting of panels according to the invention.
Figure 2:
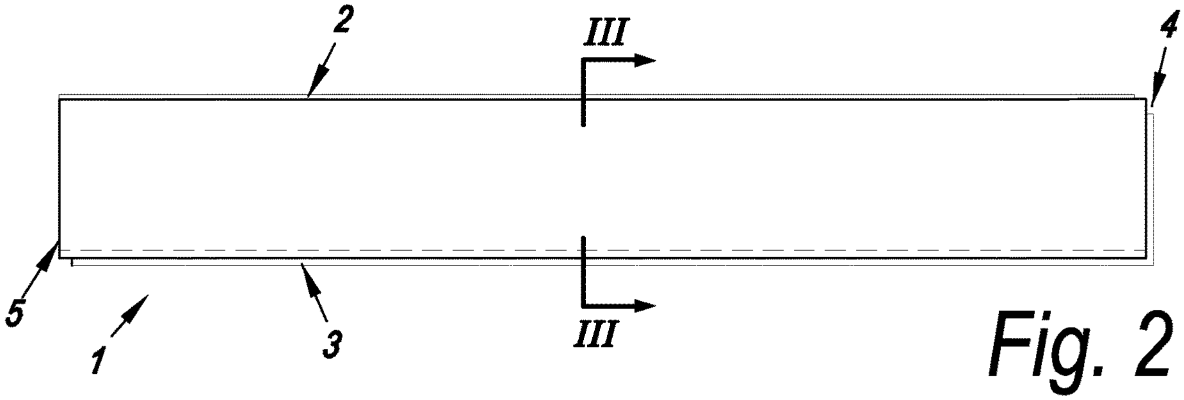
FIG. 2 shows a top view of a panel used in the floor covering of FIG. 1.

FIG. 1 shows a floor covering consisting of panels 1 according to the invention; FIG. 2 shows a top view of a panel used in the floor covering of FIG. 1. The panels 1 have coupling parts on at least one pair of opposite sides 2, 3. In the example, the panels are rectangular and elongate, and they also have coupling parts on their second pair of opposite sides 4, 5.

The panels 1 are provided with coupling parts on their first pair of opposite sides, so that these panels can be coupled together at their first pair of opposite sides by means of a angling movement W.

Figure 3:
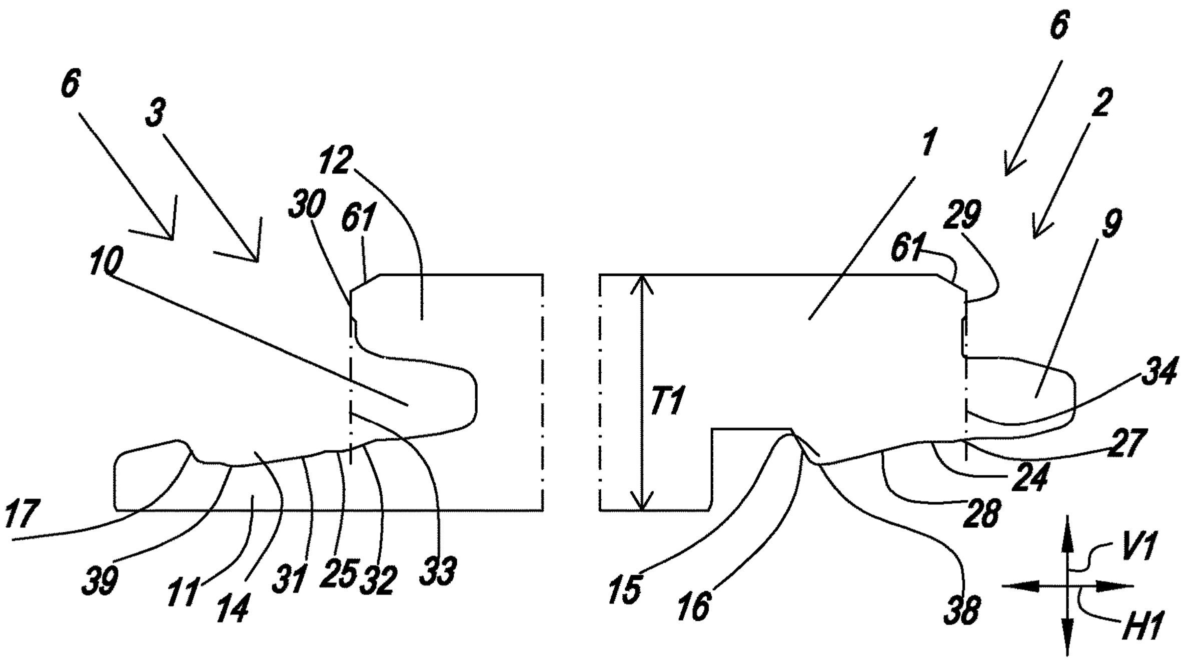
FIG. 3 shows the panel from FIG. 2 along line III-III of FIG. 2.
Figure 4:
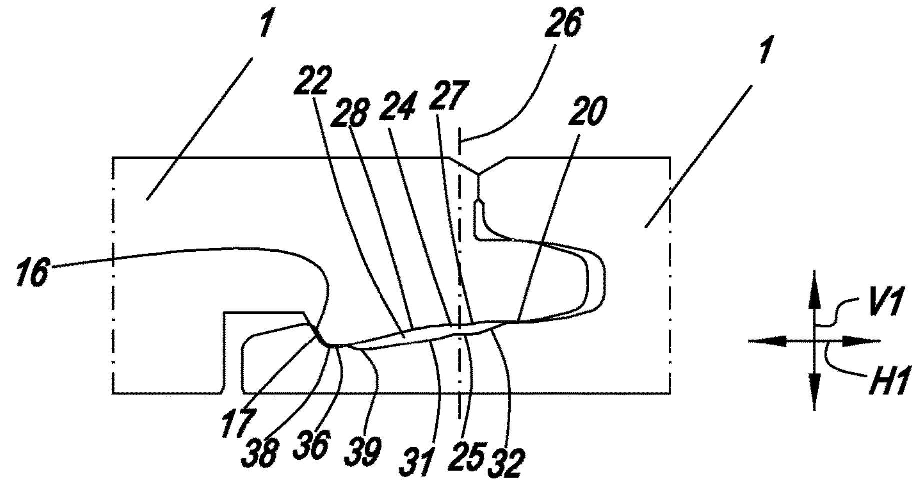
FIG. 4 shows two panels according to FIGS. 2 and 3, in coupled state.

FIG. 3 shows the floor panel 1 from FIG. 2 along line III-III of FIG. 2. The panel has a thickness T1, in this example the thickness T1 is 7 mm. FIG. 4 shows two panels according to FIGS. 2 and 3 in the state coupled together at the first pair of opposite sides. This floor panel 1 has coupling parts 6 on a first pair of opposite sides 2, 3. When two such floor panels 1 are coupled together at their first pair of opposite sides 2, 3, the coupling parts 6 establish both a lock in the vertical direction V1 perpendicular to the plane of the floor panels 1 and a lock in the horizontal direction H1 perpendicular to the respective sides 2, 3 and in the plane of the floor panels 1. The lock in the vertical direction V1 is achieved using a tongue and groove connection 9, 10, wherein said groove 10 is delimited by a lower lip 11 and an upper lip 12. In order to achieve the lock in the horizontal direction H1, the coupling parts 6 are provided with locking parts in the form of a recess 14 in the lower lip 11 and a protrusion 15 cooperating therewith on the underside of the tongue 9, which when two such floor panels 1 are coupled together, form at least horizontally active locking surfaces 16, 17, wherein the locking surface 17 which is formed on the flanks of said recess 14 is situated in a part of the lower lip 11 which extends past the upper lip 12. In the coupled state of two such panels at their first pair of opposite sides 2, 3, a contact zone 20 is formed between the underside of the tongue 9 and the lower lip 11.

The floor panel 1 is configured such that in the coupled state of two such panels at their first pair of opposite sides 2, 3, an open space 22 is present, viewed vertically, between the tongue 9 and the lower lip 11, and viewed horizontally, between the contact zone and the contact between the horizontally active locking surfaces 16, 17. The underside of the tongue 9 in the open space comprises a first face 24. The top side of the lower lip 11 in the open space comprises a second face 25. In the example shown in FIGS. 2 and 3, the first face 24 is parallel to the second face 25, and the first face 24 and the second face 25 are parallel to the plane of the panel. In coupled state of a first such panel 1 with its tongue 9 in the groove 10 of a second such panel, at least one face 26 perpendicular to the coupled panels and parallel to the first pair of opposite sides 2, 3 intersects both the first face 24 of the first coupled panel and the second face 25 of the second panel.

In the example, in the open space 22, the lower edge of the tongue 9 comprises a third face 27 distally from the first face 24, wherein the third face 27 makes a greater angle with the plane of the panel than the first face 24.

In the example, in the open space 22, the lower edge of the tongue 9 comprises a fourth face 28 proximally to the first face 24, wherein the fourth face 28 makes a greater angle with the plane of the panel than the first face 24.

Viewed from the distal direction to the proximal direction of the panel, both the third face 27 and the fourth face 28 are oriented towards the lower edge of the panel.

In the example, in the open space 22, the upper edge of the lower lip 11 comprises a fifth face 31 distally from the second face 25, wherein the fifth face 31 makes a greater angle with the plane of the panel than the second face 25.

In the example, in the open space 22, the upper edge of the lower lip 11 comprises a sixth face 32 proximally to the second face 25, wherein the sixth face 32 makes a greater angle with the plane of the panel than the second face 25.

Viewed from the distal direction to the proximal direction of the panel, both the fifth face 31 and the sixth face 32 are oriented towards the upper edge of the panel.

In the example, the third face 27 and the fourth face 28 are parallel to one another.

The side 2 containing the tongue 9 comprises a first closing face 29. The side 3 containing the groove 10 comprises a second closing face 30 at the distal end of the upper lip 12.

In coupled state of two such panels at their first pair of opposite sides 2, 3, contact is present between the first closing face 29 and the second closing face 30 of the coupled panels 1. The extension 34 of the first closing face 29 intersects the third face 27. The extension 33 of the second closing face intersects the sixth face 32. The first face 24 is situated completely proximally to the first closing face 34.

The fifth face 31 makes a greater angle with the plane of the panel than the sixth face 32. In the example of FIGS. 3 and 4, the difference between the angle of the fifth face with the plane of the panel and the angle of the sixth face with the plane of the panel is 11°.

In the example, in coupled state of two such panels at their first pair of opposite sides 2, 3, a second contact zone 36 is formed between the lower edge of the tongue 9 and the upper edge of the lower lip 11, wherein the second contact zone 36 is distally positioned with respect to the second face 25.

The second contact zone 36—considered for the floor panel coupled at its groove 10—is proximally positioned with respect to the contact between the horizontally active locking surfaces 16, 17. The second contact zone 36 extends continuously in the contact between the horizontally active locking surfaces 16, 17.

The first face 24 is situated distally from the lowest point 38 of the lower edge of the tongue 9.

In the coupled state of two such panels at their first pair of opposite sides 2, 3, a pretension is present between the horizontally active locking surfaces 16, 17 due to a bending of the lower lip 11. This bending is created by overlapping of the profiles. FIG. 4 shows the panels with the overlap, but not with the bend (and pretension) which occurs during coupling.

Two such panels can be coupled at their first pair of opposite sides 2, 3 by means of a angling movement W (see FIG. 1) of such a panel parallel to its first pair of opposite sides 2, 3, with its tongue 9 in the groove 10 of the second such panel.

The panel 1 shown in FIGS. 3 and 4 has chamfers in the form of sloping edges 61 at its first pair of opposite sides 2, 3.

Figure 5:
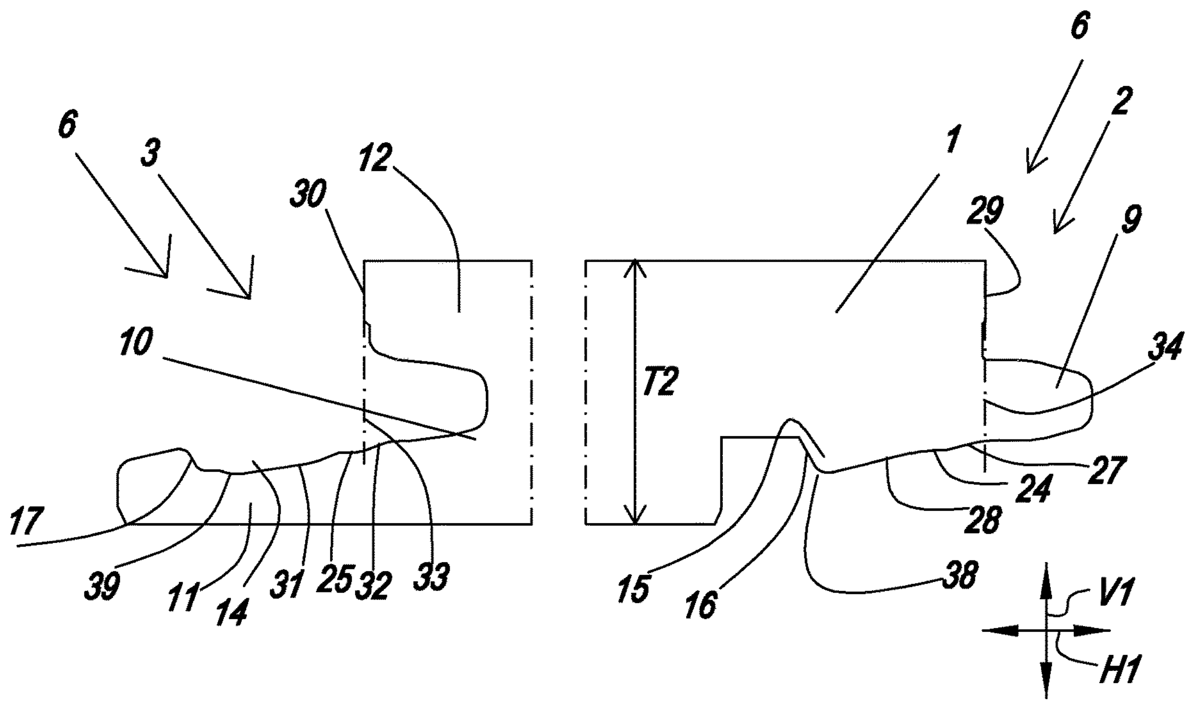
FIGS. 5 and 8 show panels according to the invention in the same view as FIG. 3.

FIG. 5 shows another example of a floor panel according to the invention in the same view as FIG. 3. The panel has a thickness T2 equal to 8 mm, and is thus thicker than the panel shown in FIGS. 3 and 4. The reference signs in FIG. 5 have the same meaning as the corresponding reference signs in FIG. 3.

The first face 24 of the floor panel of FIG. 3 is parallel to the first face of the floor panel of FIG. 5. The second face of the floor panel of FIG. 3 is parallel to the second face 25 of the floor panel of FIG. 5.

Figure 6:
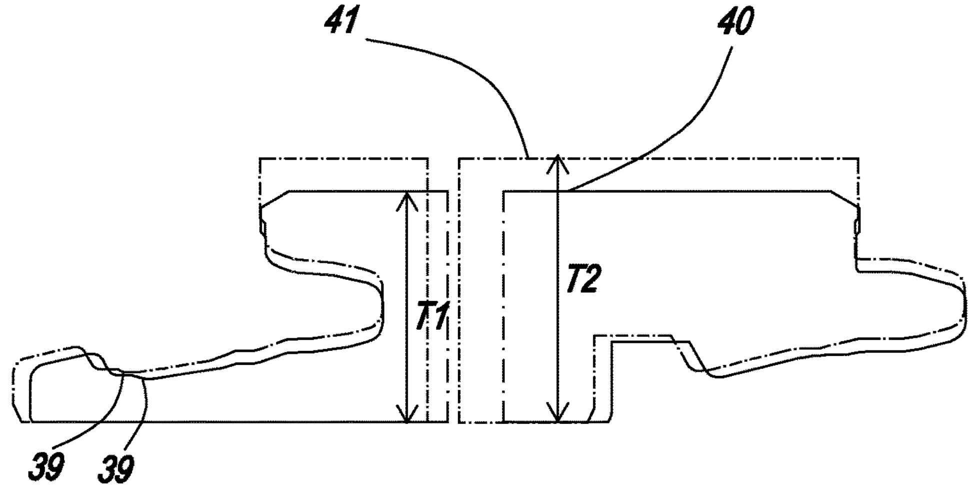
FIG. 6 shows the panels according to FIGS. 2 and 5.

FIG. 6—on the same scale—shows the panel 40 (with thickness T1=7 mm) of FIG. 3 together with the panel 41 (with thickness T2=8 mm) of FIG. 5. The tongue and groove of both these panels are produced with the same cutting tools. The lower lip of the thicker floor panel 41 protrudes over a greater distance relative to its upper lip than is the case with the thinner floor panel 40. The deepest point 39 of the recess in the lower lip 11 of the thicker floor panel 41 lies at a greater distance from the lower edge of the panel than in the thinner floor panel 40. The difference in distance between the lower edge of the panel and the deepest point 39 of the recess 14 in the lower lip 11, between the thicker floor panel 41 and the thinner floor panel, is smaller than the difference in thickness between the two floor panels.

Figure 7A:
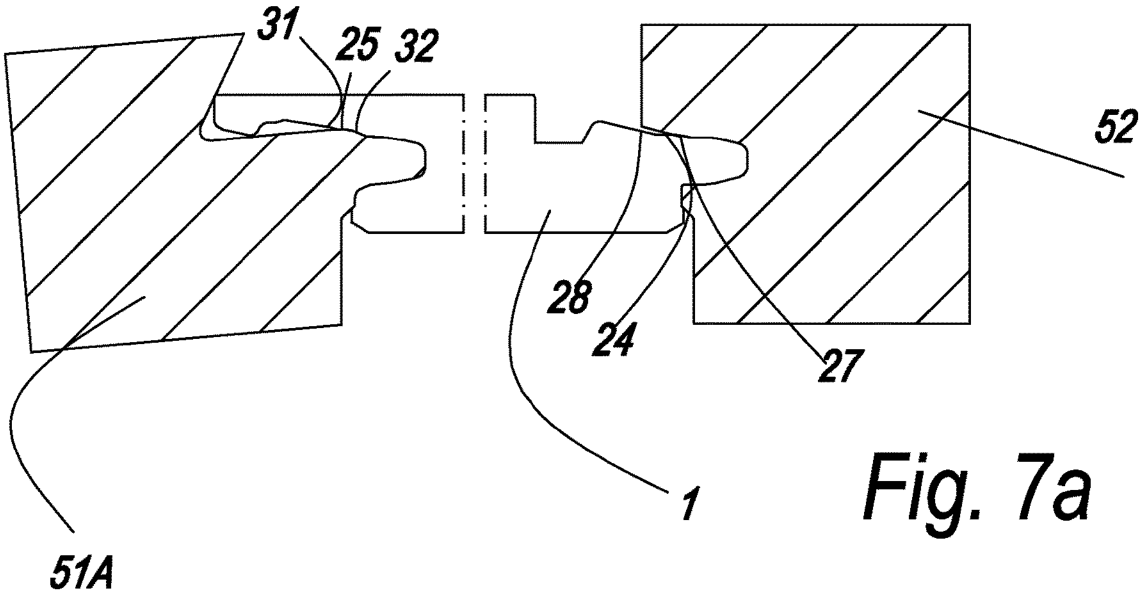
FIGS. 7*a* and 7*b* show steps in the production of the coupling parts of the panel from FIG. 3.
Figure 7B:
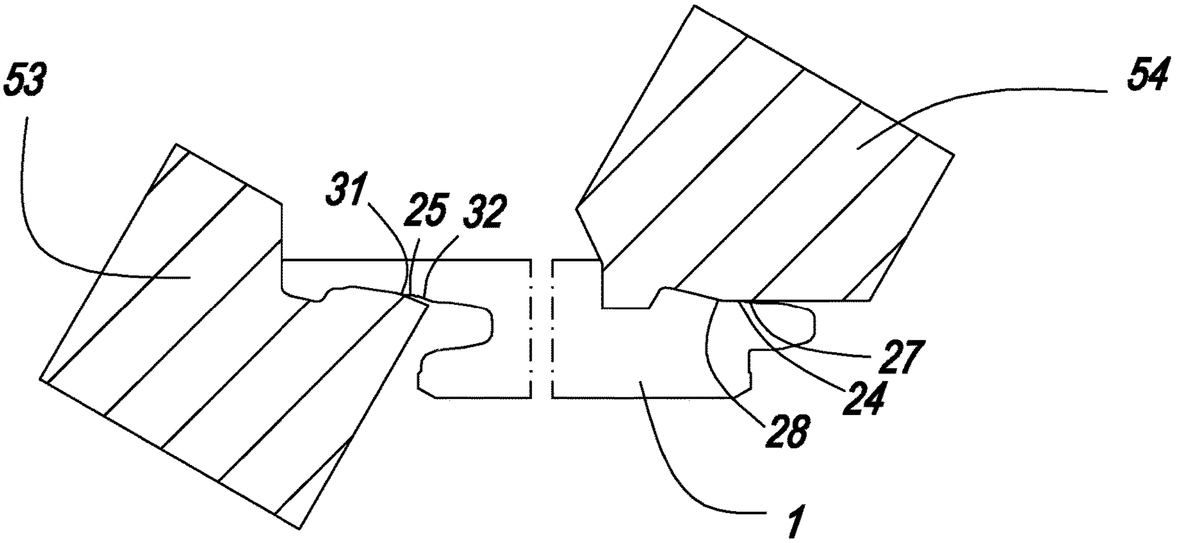

FIGS. 7*a* and 7*b* show, as an example of the method according to the invention, steps in the production of coupling parts of the panel in FIG. 3. A standard continuous milling machine with several milling cutters on two edges is used to form the coupling parts on both sides of the pair of opposite sides 2, 3 simultaneously. The coupling parts are produced by means of a number of milling operations using cutting tools, more specifically milling cutters. FIGS. 7*a* and 7*b* do not show all steps, but only those in which the tongue 9 and the groove 10 are formed. The profiles of the coupling parts shown in FIGS. 7*a* and 7*b* are those of the final coupling parts of the panel.

FIG. 7*a* shows a step in forming the tongue and groove. Cutting tool 52 forms the distal end of the tongue 9 and also the third face 27 of the floor panel 1.

Cutting tool 51A forms the second face 25 and the sixth face 32 of the panel, and the proximal end of the groove 10.

The next steps in forming the tongue and groove are shown in FIG. 7*b*. Cutting tool 54 forms the first face 24 and the fourth face 28. Cutting tool 53 forms the fifth face 31 and also the locking surface 17 situated on the flanks of the recess 14 of the lower lip 11.

The coupling parts of the panel in FIG. 5 are formed with the same design of the four cutting tools 51A, 52, 53 and 54. Only the relative position of these cutting tools with respect to the panel concerned is modified.

Figure 8:
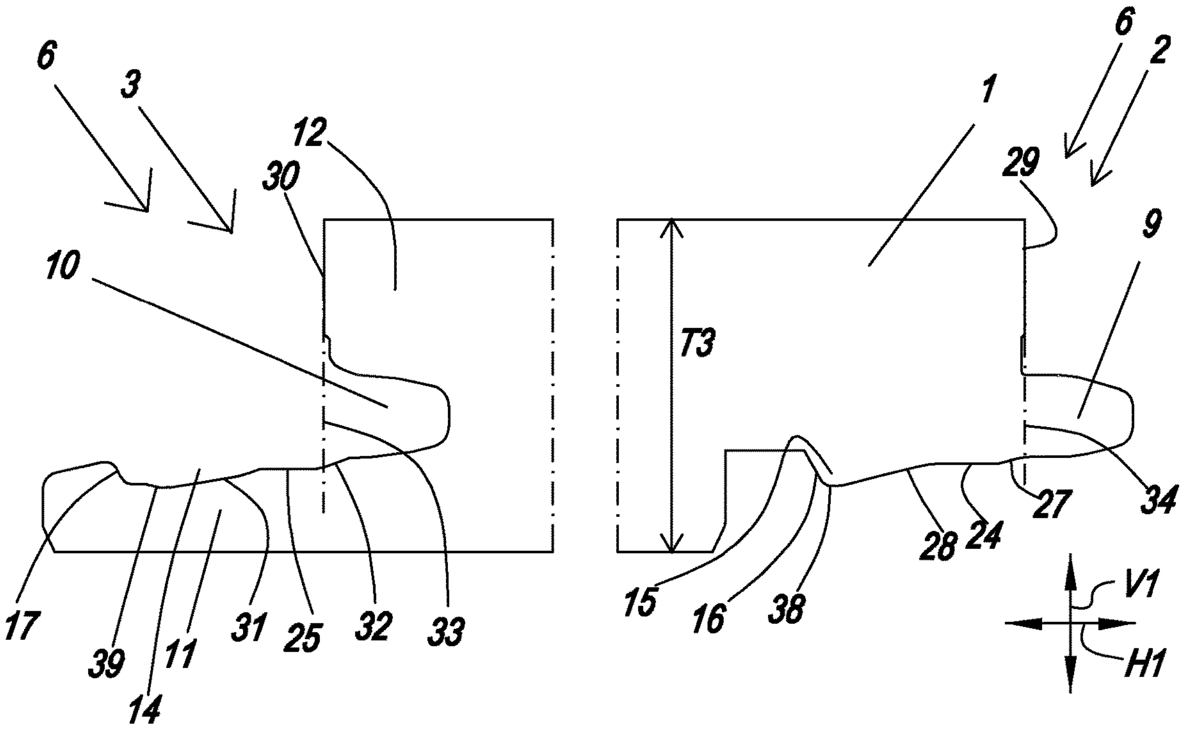

FIG. 8 shows another example of a floor panel according to the invention in the same view as FIG. 3. The panel has a thickness T3 equal to 10 mm, and is thus thicker than the panels shown in FIGS. 3 and 5. The reference signs in FIG. 8 have the same meaning as the corresponding reference signs in FIG. 3.

The first face 24 of the floor panel of FIG. 3 is parallel to the first face 24 of the floor panel of FIG. 8. The second face 25 of the floor panel of FIG. 3 is parallel to the second face 25 of the floor panel of FIG. 8.

Three of the four cutting tools shown in FIGS. 7*a* and 7*b* for forming the tongue and groove of the panels in FIGS. 3 and 5 are also used for forming the tongue and groove of the panel in FIG. 8. These are the tools 52, 53 and 54.

Figure 9A:
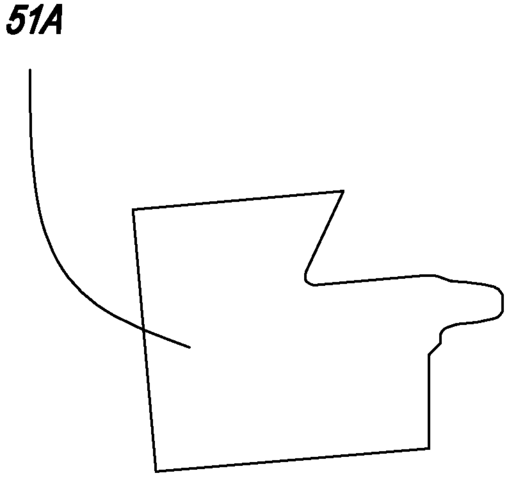
FIGS. 9*a* through 9*c* show the differences in the tools used for the production of the coupling parts of the panels shown in FIGS. 3 and 8.
Figure 9B:
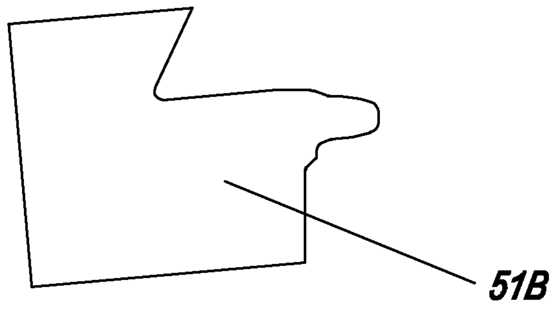
Figure 9C:
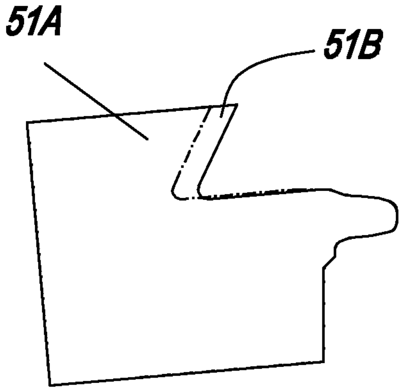

Tool 51A in FIG. 7*a*, used for producing part of the groove of the panels in FIGS. 3 and 5, is replaced by suitable tool. Tool 51A, used for producing part of the groove of the panel in FIG. 3, is shown in FIG. 9*a*, while the suitable tool 51B used for producing part of the groove of the panel in FIG. 8, is shown in FIG. 9*b*. FIG. 9*c* shows both tools 51A and 51B.

The invention claimed is:

1. A floor panel wherein the floor panel has coupling parts on a first pair of opposite sides, wherein the coupling parts of a first floor panel arranged as floor panel are arranged to couple to coupling parts of a second floor panel of said floor panel at a first pair of opposite sides, and establish both a lock in a vertical direction perpendicular to a plane of the floor panels and a lock in a horizontal direction perpendicular to the respective sides and in the plane of the floor panels, wherein the lock in the vertical direction is achieved using a tongue and groove connection, wherein said groove is delimited by a lower lip and an upper lip, wherein in order to achieve the lock in the horizontal direction, the coupling parts are provided with locking parts in a form of a recess in the lower lip and a protrusion cooperating therewith on an underside of the tongue forming at least horizontally active locking surfaces, wherein a locking surface is formed on flanks of said recess is situated at least partially in a part of the lower lip extending past the upper lip, wherein in a coupled state of the first and second panels at the first pair of opposite sides, a contact zone is formed between the underside of the tongue and the lower lip;

wherein the floor panel is configured such that in the coupled state of the first and second panels at the first pair of opposite sides, an open space is present, viewed vertically, between the tongue and the lower lip, and viewed horizontally, between the contact zone and the contact between the horizontally active locking surfaces;

wherein the underside of the tongue in the open space has a first face; and a top side of the lower lip in the open space has a second face; and wherein in coupled state of the first panel with the tongue in the groove of the second panel, at least one face perpendicular to the coupled panels and parallel to the first pair of opposite sides intersects both the first face of the first coupled panel and the second face of the second panel;

wherein in the open space, the lower edge of the tongue comprises a third face distally from the first face, wherein the third face makes a greater angle with the plane of the panel than the first face;

wherein in the open space, the lower edge of the tongue comprises a fourth face proximally to the first face, wherein the fourth face makes a greater angle with the plane of the panel than the first face;

wherein in the open space, an upper edge of the lower lip comprises a fifth face distally from the second face, wherein the fifth face makes a greater angle with the plane of the panel than the second face;

wherein in the open space, the upper edge of the lower lip comprises a sixth face proximally to the second face, wherein the sixth face makes a greater angle with the plane of the panel than the second face.

2. The floor panel according to claim 1, wherein, viewed from a distal direction to a proximal direction of the panel, both the third face and the fourth face are oriented towards the lower edge of the panel.

3. The floor panel according to claim 1, wherein, viewed from a distal direction to a proximal direction of the panel, both the fifth face and the sixth face are oriented towards an upper edge of the panel.

4. The floor panel according to claim 1, wherein the angle between the third face and the fourth face is less than 3°, wherein the third face and the fourth face are parallel to one another.

5. The floor panel according to claim 1, wherein the fifth face makes a greater angle with the plane of the panel on the sixth face;

wherein a difference between the angle of the fifth face with the plane of the panel and the angle of the sixth face with the plane of the panel is more than 10°.

6. The floor panel according to claim 1, wherein the side of the first pair of opposite sides containing the tongue comprises a first closing face, and the side of the first pair of opposite sides containing the groove comprises a second closing face at a distal end of the upper lip, wherein in coupled state of the first and second panels at the first pair of opposite sides, there is contact between the first closing face and the second closing face of the coupled panels, wherein extension of the first closing face intersects the third face.

7. The floor panel according to claim 1, wherein the side of the first pair of opposite sides containing the tongue comprises a first closing face, and the side of the first pair of opposite sides containing the groove comprises a second closing face at a distal end of the upper lip, wherein in coupled state of the first and second panels at the first pair of opposite sides, there is contact between the first closing face and the second closing face of the coupled panels, wherein extension of the second closing face intersects the sixth face.

8. The floor panel according to claim 1, wherein in coupled state of the first and second panels at the first pair of opposite sides, a second contact zone is formed between the lower edge of the tongue and the upper edge of the lower lip, wherein the second contact zone, considered for the floor panel coupled at the groove, is distally positioned with respect to the second face.

9. The floor panel according to claim 8, wherein the second contact zone, considered for the floor panel coupled at the groove, is proximally positioned with respect to the contact between the horizontally active locking surfaces and/or wherein the second contact zone extends continuously in the contact between the horizontally active locking surfaces.

10. The floor panel according to claim 1, wherein in the coupled state the first pair of opposite sides, a pretension is present between the horizontally active locking surfaces, due to a bending of the lower lip.

11. The floor panel according to claim 1, wherein the first and second floor panel are arranged to be coupled at the first pair of opposite sides by an angling movement of the first panel parallel to the first pair of opposite sides, with the tongue in the groove of the second panel.

12. The floor panel according to claim 1, wherein the side of the first pair of opposite sides containing the tongue comprises a first closing face, and the side of the first pair of opposite sides containing the groove comprises a second closing face at a distal end of the upper lip, wherein in coupled state of the first and second panels at the first pair of opposite sides, there is contact between the first closing face and the second closing face of the coupled panels, wherein the first face is situated completely proximally to the first closing face.

13. The floor panel according to claim 1, wherein the first face is situated distally from the lowest point of the lower edge of the tongue.

14. The floor panel according to claim 1, wherein the floor panel contains a substrate, wherein the substrate comprises one or more of:

a wood-based substrate, including one or more wood layers, a chipboard or a fibreboard;

a synthetic substrate, wherein the synthetic substrate comprises a polymer matrix and optional fillers, wherein the polymer of the polymer matrix consists polyvinyl chloride, polyurethane or polypropylene, wherein the optional fillers comprise one or more mineral fillers or wood-based fillers a mineral substrate selected from a group consisting a magnesium oxide board, a gypsum board, a fibre cement board, and a mineral fibre board wherein mineral fibres are bonded together by means of a resin.

15. A method for producing floor panels, wherein a first floor panel is produced with a first thickness, wherein a second floor panel is produced with a second thickness, wherein the first floor panel and the second floor panel are floor panels according to claim 1;

wherein the first face of the first floor panel is parallel to the first face of the second floor panel; and/or wherein the second face of the first floor panel is parallel to the second face of the second floor panel.

16. The method according to claim 15, wherein the first face of the first floor panel and the first face of the second floor panel are formed by a same cutting tool and/or wherein the second face of the first floor panel and the second face of the second floor panel are formed by the same cutting tool, wherein the cutting tool forms the proximal end of the groove of the first floor panel and the proximal end of the groove of the second floor panel and/or wherein a distal end of the tongue of the first floor panel and a distal end of the tongue of the second floor panel are formed by the same cutting tool, wherein the cutting tool also forms the third face of both the first floor panel and of the second floor panel and/or wherein the locking surface situated on the flanks of the recess of the first floor panel, and the locking surface situated on the flanks of the recess of the second floor panel, are formed by the same cutting tool, wherein the same cutting tool forms the fifth face of the first floor panel and of the second floor panel.

17. The method according to claim 15, wherein the difference in thickness between the first floor panel and the second floor panel is at least 2 millimetres, and/or wherein the first floor panel is thicker than the second floor panel, and wherein the lower lip of the first floor panel protrudes over a greater distance relative to the upper lip than is the case in the second floor panel and/or wherein the first floor panel is thicker than the second floor panel, and wherein the deepest point of the recess in the lower lip of the first floor panel lies at a greater distance from the lower edge of the panel than in the second floor panel;

wherein a difference in distance between the lower edge of the panel and the deepest point of the recess in the lower lip between the first floor panel and the second floor panel is smaller than the difference in thickness between the first floor panel and the second floor panel.

18. The method according to claim 15, wherein the first face is formed by a first cutting tool and wherein a distal end of the tongue is formed by a second cutting tool and/or wherein the second face is formed by a third cutting tool and wherein the locking surface situated on the flanks of the recess of the floor panel is formed by a fourth cutting tool.

19. A cutting tool for use in a method according to claim 15 and/or for a production of a floor panel, wherein the cutting tool is configured for producing the first face.

20. The cutting tool according to claim 19, wherein the cutting tool is a milling cutter.

* * * * *